United States Patent
MacGregor et al.

(10) Patent No.: US 7,392,124 B2
(45) Date of Patent: Jun. 24, 2008

(54) CROP CUTTING HEADER WITH SPEED CONTROL OF DRIVEN ELEMENT USING VALVE PROFILING

(75) Inventors: Don MacGregor, Winnipeg (CA); James Thomas Dunn, Winnipeg (CA)

(73) Assignee: MacDon Industries Ltd., Winnipeg, Manitoba (CA)

( * ) Notice: Subject to any disclaimer, the term of this patent is extended or adjusted under 35 U.S.C. 154(b) by 473 days.

(21) Appl. No.: 11/283,412

(22) Filed: Nov. 21, 2005

(65) Prior Publication Data

US 2007/0119136 A1    May 31, 2007

(51) Int. Cl.
G06F 7/70 (2006.01)
G06F 19/00 (2006.01)
G06G 7/00 (2006.01)
G06G 7/76 (2006.01)

(52) U.S. Cl. .......................................... 701/50
(58) Field of Classification Search .................. 701/50, 701/34, 28, 23, 102; 340/684, 439, 989; 477/111; 460/6; 56/10.1, 10.2 H, 10.2 G, 56/10.2 R, 10.2 A
See application file for complete search history.

(56) References Cited

U.S. PATENT DOCUMENTS

| | | | |
|---|---|---|---|
| 4,893,241 A * | 1/1990 | Girodat et al. ................. 701/50 |
| 5,613,352 A * | 3/1997 | Panoushek et al. ......... 56/10.2 E |
| 6,009,370 A * | 12/1999 | Minowa et al. ............. 701/102 |
| 6,282,476 B1 * | 8/2001 | Hieronymus et al. .......... 701/50 |
| 6,587,771 B2 * | 7/2003 | Panoushek et al. ............ 701/50 |
| 6,865,870 B2 * | 3/2005 | Heisey ..................... 56/10.2 G |
| 6,965,822 B2 * | 11/2005 | Brome et al. .................. 701/50 |
| 2003/0093202 A1 * | 5/2003 | Panoushek et al. ............ 701/50 |
| 2007/0255470 A1 * | 11/2007 | Diekhans et al. .............. 701/50 |
| 2007/0282507 A1 * | 12/2007 | Strosser et al. ................ 701/50 |
| 2007/0288147 A1 * | 12/2007 | Reeves ........................ 701/50 |

* cited by examiner

*Primary Examiner*—Árpád Fábián-Kovács
(74) *Attorney, Agent, or Firm*—Adrian D. Battison; Michael R. Williams; Ryan W. Dupuis

(57) ABSTRACT

In a swather formed by a tractor and attached header for cutting standing crop to form a swath, reel speed and optionally draper speed are controlled relative to ground speed by a control system including a manually operable input and display available to the operator. The control system acts to calibrate" the control output so that the control module has a secondary reference point as to how the PWM valve should function in the event of a speed sensor failure. Instead of using the speed sensor signal as a reference, the control system now compares the set point with the stored table (which may in one example provide 256 values) containing the PWM voltage/current values. These values correspond to a set of actual speed sensor values taken during the profiling procedure, plus extrapolated values equalling 256 points.

8 Claims, 3 Drawing Sheets

CROP CUTTING HEADER WITH SPEED CONTROL OF DRIVEN ELEMENT USING VALVE PROFILING

This invention relates to a crop cutting header with an operator controlled system for maintaining speed of a driven element of the header.

BACKGROUND OF THE INVENTION

Crop harvesting machines, like windrowers and combines use various driven elements to effect the cutting and harvesting systems including a cutting system and commonly a reel. The speed of the cutting system is generally variable to accommodate different crop conditions and different harvesting speeds. The reel is used to lift crop that is down & lodged so the cutting mechanism has good access to the plant (not leaving any seeds or desirable plant material behind) and to push the crop into the header for conveying to the windrow discharge. For maximum efficiency (effectively raise the plants, minimize seed shatter, minimize wear on mechanical parts and minimize power required to drive the reel), it is highly desirable that the reel run at the right speed and that the operator has full control of the reel speed for all crop and ground speed conditions.

Reel speed controlled relative to vehicle ground speed has been used on combines for some time to assist the operator to obtain the right speed without excessive input from the operator (which causes fatigue).

Speed sensors are commonly used to provide feedback to a control system and or the machine operator via a digital display. The operator can then monitor and control the operating speed of the item by means of a switch or potentiometer. Using the knife drive speed sensor as an example, the system would normally function as follows:

The operator has a digital readout of the operating speed and through keypad entry on the dash display, the desired speed/rpm of the knife can be set. Once the desired speed has been programmed into the display, the control module continually reads this speed signal and compares it to the desired set point. The control module then outputs a PWM control signal which is used to drive a PWM controlled hydraulic valve. In turn the hydraulic valve varies the flow to the knife drive motor and thus controls the speed of operation. When there is a predetermined amount of deviation from the set point, the control module programming determines how much voltage or current change (+/−) is required in the PWM valve drive signal to bring the actual speed back the desired speed. As long as a signal is being received from the speed sensor, the control module can adjust the output to control the speed. However, if the speed sensor fails, the control system has no way to dynamically determine how to correct the speed when a change is required. The operator could still input a different set point, but the control module would not know how much of a PWM control signal is required to maintain the desired set point.

SUMMARY OF THE INVENTION

It is one object of the invention to provide a swather with an operator controlled system for maintaining reel speed at a set index value relative to ground speed.

According to a first aspect of the present invention there is provided a crop harvesting header arranged to be attached to a tractor so as to be moved thereby over the ground for harvesting a standing crop comprising:

a header frame;

a cutting knife arranged to provide a cutting action across a width of the header for cutting the standing crop, the knife being driven by a knife drive system;

a reel mounted above the cutting knife for rotation about a reel axis generally parallel to the ground and at right angles to the direction of operation such that bats of the reel pass over the cutting knife to carry the crop rearwardly of the knife, the reel being driven by a reel drive system;

a convergence device rearward of the cutting knife for converging the cut crop into a swath for discharge from the header onto the ground, the convergence device being driven by a convergence device drive system;

a speed control module for controlling a speed of operation of at least one of the knife drive system, the reel drive system and the convergence device drive system;

a sensor for monitoring the speed of said at least one of the drive systems;

the control module including a manually operable member for manually setting a desired speed of said at least one of the drive systems;

said at least one of the drive systems including a hydraulic motor for providing an output drive, a PWM valve to which an electrical signal is applied for supplying hydraulic fluid to the hydraulic motor at a rate which determines a speed of the drive;

the control module including a control program and a memory for supplying data for the control program;

the control module being arranged, when a required speed is set by the manually operable member, to obtain a feedback value from the sensor of the actual speed and to control supply of the value of electrical signals to the PWM valve in accordance with the feedback value to maintain the actual speed at the required speed;

the memory module including a look-up table of values of electrical signals for the PWM associated with speeds;

the control module being arranged, when no feedback value is obtained from the sensor of the actual speed, to control the PWM valve in accordance with values of electrical signals obtained from the look-up table.

Preferably the look-up table comprises voltage/current values for the PWM.

Preferably the look-up table contains 256 values.

Preferably the values correspond to a set of actual speed sensor values taken during a profiling procedure.

Preferably the values contain extrapolated values.

Preferably the extrapolated values are corrected for valve non-linearity when the extrapolation is done.

Preferably, when a feedback value is obtained from the sensor of the actual speed, the control module uses the lookup table to get a base PWM value and a feedback value is obtained from the sensor signal and is then added to this base value.

Preferably the feedback (sensor) signal corrects for valve load, temperature, system voltage and any valve differences compared to the valve that the profile was made from.

Thus, in order to overcome this shortcoming and maintain a degree of control a technique called valve profiling has been developed and is presented herein. The concept is to be able to "calibrate" the control output so that the control module has a secondary reference point as to how the PWM valve should function in the event of a speed sensor failure. Instead of using the speed sensor signal as a reference, the control system now compares the set point with the stored table (which may in one example provide 256 values) containing the PWM voltage/current values. These values correspond to a set of actual speed sensor values taken during the profiling procedure, plus extrapolated values equalling 256 points.

BRIEF DESCRIPTION OF THE DRAWINGS

One embodiment of the invention will now be described in conjunction with the accompanying drawings in which.

In the drawings like characters of reference indicate corresponding parts in the different figures.

Table 1 is a set of some values of an example of a table of values obtained for the knife drive of an Auger header.

DETAILED DESCRIPTION

Reference is made to co-pending application Ser. No 11/116,417 filed Apr. 28, 2005 by the present assignees which discloses and claims some of the features described hereinafter.

Figure 1:
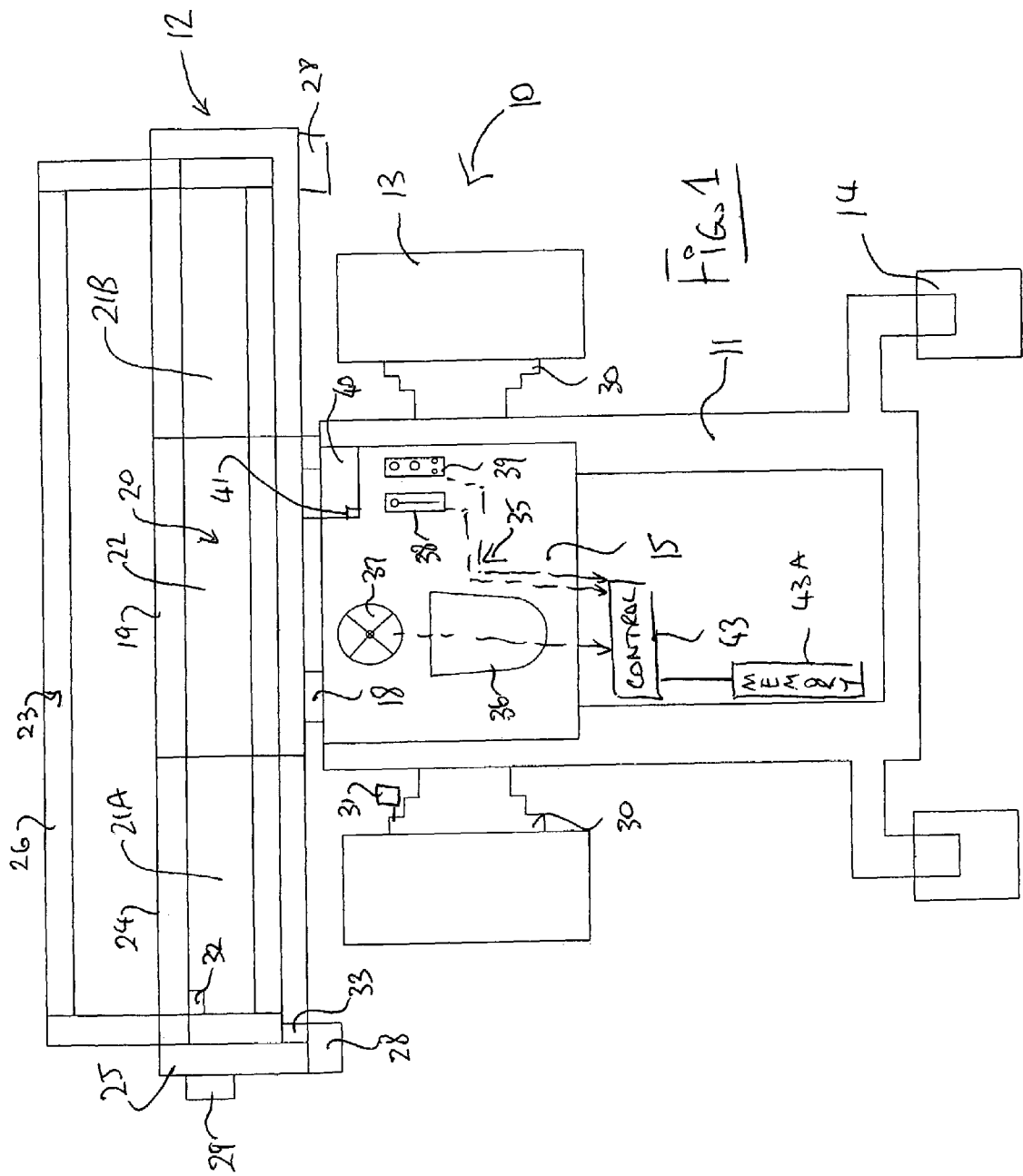
FIG. 1 is a schematic plan view of a swather according to the present invention.
Figure 2:
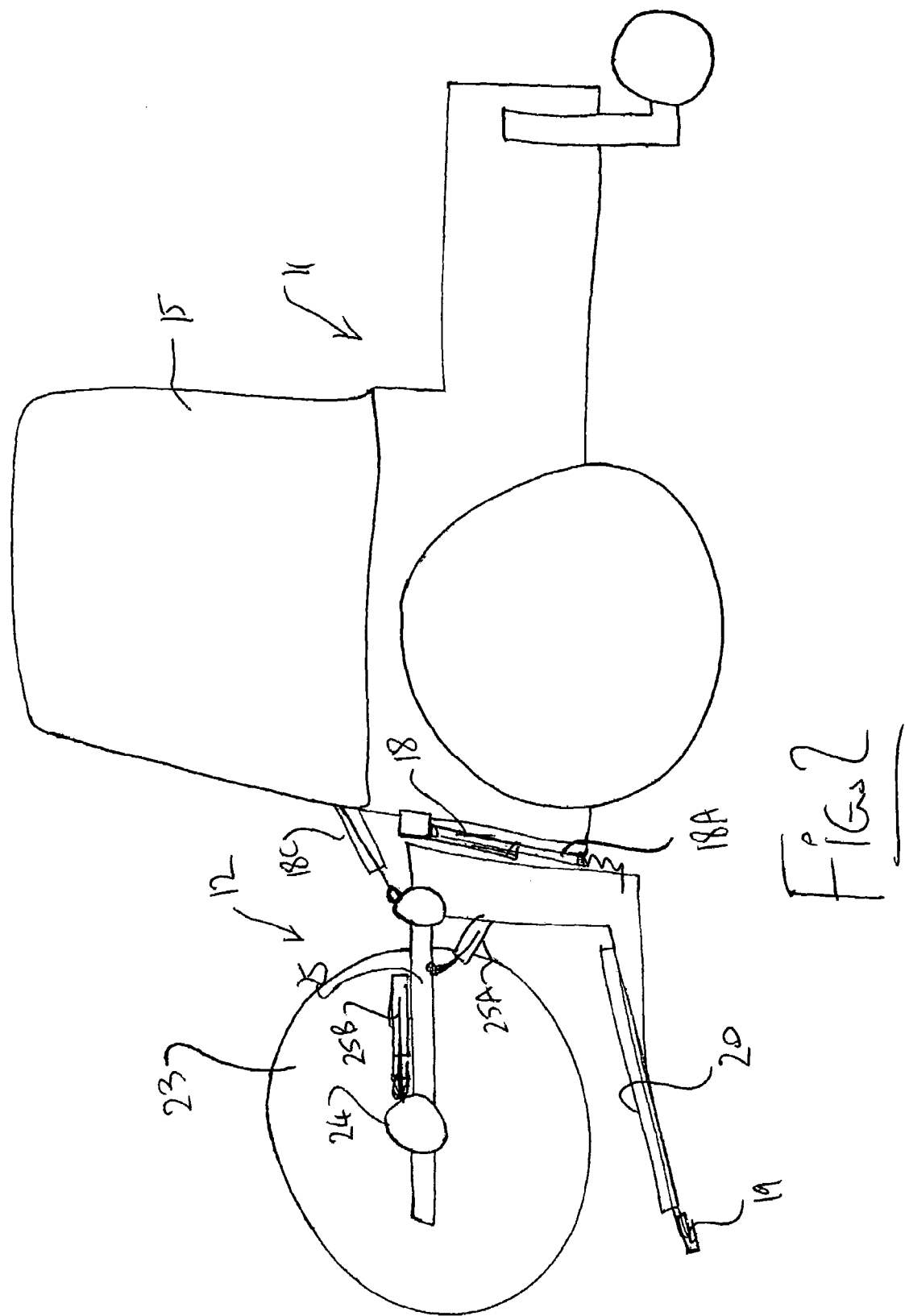
FIG. 2 is a schematic side elevational view of the swather of FIG. 1.

In FIG. 1 is shown a swather generally indicated at 10 which includes a tractor 11 and a header 12. The swather tractor is preferably of the type which includes driven front wheels 13 and trailing rear castor wheels 14 with a cab 15 over the front wheels and an engine and drive arrangement 16 at the rear wheels. The tractor includes header support members 18 at the forward end which mount the header in front of the tractor for movement across the ground for cutting standing crop.

The header support members are shown only schematically but generally include a pair of side arms 18A and 18B each adjacent a respective wheel of the tractor and extending forwardly to a respective location on the header. The arm height can be adjusted to raise and lower the header at that position. An adjustable central link 18C extends forwardly from the center of the tractor to the top of the header so as to pivot the header forwardly and rearwardly about a transverse axis at the support at the arms 18A and 18B. Such adjustments are conventional and well known to a person skilled in this art. They are shown only schematically since different designs of the specific links are available.

The header includes a front cutting knife 19 at the front edge of a table 20 at which is located a converging system which, in the example shown, is a pair of drapers 21A and 21B which carry the cut crop inwardly from ends of the header toward a central opening area 22 at which the swath is formed and deposited in the area underneath the tractor. On the head is mounted a reel 23 which has a central support 24 carried on a pair of arms 25 with radially extending members which support longitudinally extending bats 26 which rotate around the axis defined by the support 24.

The position of the reel relative to the header can be adjusted in height by raising and lowering the arms 25 by a cylinder 25A on each side and in fore and aft location along the arms by a cylinder 25B on each side. Such adjustments are conventional and well known to a person skilled in this art. They are shown only schematically since different designs of the specific links are available.

The converging system of the header is driven by a motor schematically indicated at 28 which may be provided by a common motor and mechanical linkage or by a pair of motors as shown, one motor for each draper. The reel is driven by a motor schematically indicated at 29. The ground wheels are each driven by a motor schematically indicated at 30. A sensor 31 detects ground speed. A sensor 32 detects reel speed. A sensor 33 may be provided to detect conveyor speed or alternatively a sensor may be omitted here because less precision is required in the case of the conveyors as opposed to the reel speed. For the conveyor the system can use the relative value of the control signals for control purposes.

Within the cab 15 is mounted a operator console generally indicated at 35 which includes a seat 36, a steering arrangement 37, a speed control 38 and an implement control system 39. In front of the operator is provided a display 40 which includes at least one switch 41. All of the elements concerned including the speed of the various motors, the inputs from the sensors and the inputs from the control elements are supplied to a control system schematically indicated at 43.

Figure 3:
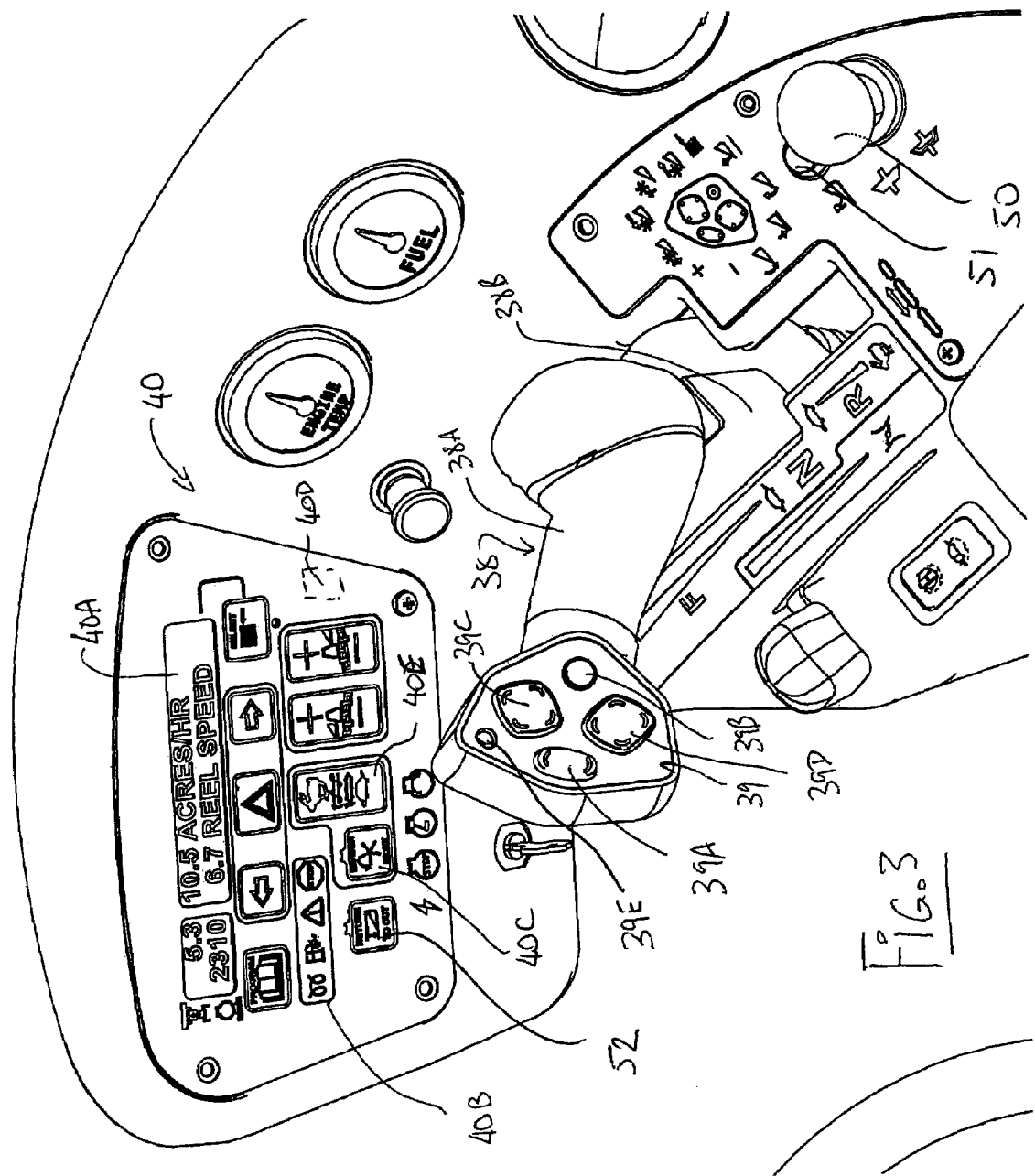
FIG. 3 is a plan view on an enlarged scale showing the operators console including the ground speed and header control members.

In FIG. 3, the display is shown in more detail as indicated at 40 and includes an LCD display area 40A and a plurality of individual indicator lights 40B. A switch 40C is one of a number of switches and is provided to actuate the control of the reel or header speed relative to the ground speed as described hereinafter. The speed control is shown at 38 and comprises a conventional lever moveable forward and rearward in a track 38B. The control 39 is mounted on the end of the lever 38A and includes a plurality of switches which control the header or implement. The manual control 39 includes a reel speed control switch 39A and a scroll switch 39B. The control 39 also includes a first four-way switch 39C which acts in one axis to raise/lower the reel by operation of the cylinders 25A and in the other axis to positions the reel fore/aft by operation of the cylinders 25B. The control 39 also includes a second four way switch 39D which acts in one axis to raise/lower the header by operation of the cylinders 18A and in the other axis to tilt the header forward/rearward by operation of the cylinder 18C.

The controls further include a header engage switch 50 for actuating drive to the header, a reverser switch 51 which controls reverse drive to the header in the event of a blockage and a return to cut switch 52 which acts to immediately return the header to the set cut position when raised out of cut position.

In a first simplified arrangement of the control system, the arrangement described herein controls the speed of the reel relative to the ground speed as described hereinafter. In an alternative arrangement which is slightly the same construction, the speed of the reel can be tied to the speed of the converging system so that they are driven at the same speed which is then controlled relative to ground speed as described hereinafter. In this case the reel and the converging system may be driven by a common motor and connected by a mechanical linkage.

In other arrangements, the converging system may be driven at a constant speed regardless of the ground speed and this arrangement is commonly used in regard to auger type converging systems whereas draper systems generally require control of the draper speed relative to the ground speed.

In a more complex arrangement the system may provide independent control of the reel speed and the draper speed relative to ground speed as described hereinafter.

In this case, therefore, there is provided a separate system for controlling the draper speed which requires a separate switch from the reel speed switch.

Turning therefore to the single control arrangement, this includes the ground speed sensor 31 and the reel speed sensor 32. These provide input into the controller 43 which then acts to display these values to the operator in the operator's console at the display 40.

It will be appreciated that the operator has primary control over the ground speed which is controlled by the operator in dependence upon the crop conditions so that the operator maximizes the ground speed while accommodating the different crop conditions. Thus the ground speed controls the amount of crop which feeds into the system and also controls the proper handling of that crop as it is fed into the header.

The switch 40C can be operated by the operator from an on position in which the controller automatically controls the reel speed (or the header speed) relative to ground speed and an off position in which the reel speed is controlled manually by the operator.

In the arrangement described herein, the controller is arranged such that in the on position of the switch 40C the reel speed is controlled at a speed of the bats of the reel relative to the ground which is maintained at a predetermined difference or index relative to the ground speed. Thus in normal operating conditions, the reel bats move at a speed different from the ground speed by an index value. The index can be positive or negative so that in some cases the reel speed is less than ground speed. Thus the reel speed is maintained at a speed which is equal to the ground speed plus a predetermined index value which is maintained constant until changed by the operator.

When the switch 40C is in the on position, the reel speed control switch 39A can be operated by the operator to vary the index. Thus the index value can be decreased by pressing the toggle switch 39A to the left and the index value can be increased by pressing the toggle switch 39A to the right. When set, the index value is maintained constant until changed by the operator. The index value can vary for example between minus 2 and plus 3. The actual reel speed is therefore calculated by summing the ground speed, as it varies as controlled by the operator and the index value to provide an actual value of reel speed which is controlled by the controller 43 through the motor 29.

Thus the speed of the reel can be controlled by the single on off switch 40C together with the increase and decrease switch 39A.

In addition, in some cases it is desirable to set a minimum reel speed. Thus even if the ground speed falls to a very low value it is necessary that the reel speed is maintained above a minimum value even when the sum of the ground speed and the index value falls below that minimum speed. Thus the system allows the operator to set a minimum reel speed and the controller operates to maintain the reel speed at a value equal to the sum of the ground speed and the index value down to the minimum value and then to maintain the reel speed at that minimum value until the ground speed is increased again to a value such that the sum of the ground speed and the index value becomes greater than the minimum reel speed value.

The minimum reel speed value is set by actuating the scroll switch 39B so that the display scrolls through a number of different values. One of those values which can be scrolled is that of the minimum reel speed. When the minimum reel speed value is displayed on the display 40, operation of the switch 39A in the increase or decrease direction acts to control or vary the minimum reel speed value.

Yet further the controller is arranged such that, while in the automatic control mode, when the reel speed falls to the minimum speed, the display is automatically modified so as to display the minimum reel speed value. While the minimum speed value is displayed, manual operation of the switch 39A varies the minimum value.

The display 40 also includes a tone generator 40D which is provided to generate warning tones to the operator. The controller 43 is arranged such that, when the minimum reel speed value is being displayed and when the operator operates the switch 39A, in order to ensure that the operator is aware that operation of the switch 39A will vary the minimum value rather than the index value or the actual value of reel speed, a tone is emitted by the tone generator 40D to warn the operator that minimum reel speed value is being changed.

The controller is further arranged such that when the minimum reel speed value is displayed, the display is steady when minimum reel speed is less than ground speed and the display is flashing when the minimum reel speed is greater than ground speed.

The above systems are used to ensure that the operator is aware of exactly what is being modified and exactly what the condition of the system is when the switch 39A is operated.

In this way, the various parameters of operation of the reel speed can be controlled using simply the on/off switch 40C, the scroll switch 39B and the main manual increase/decrease switch 39A. This therefore simplifies the system to the operator so that the main operation of the increasing and decreasing action is effected by the single switch 39A.

As an optional arrangement, in addition to the control of the reel speed, separate control to the speed of the draper is provided. In this arrangement, a switch 40E, which is additional to the switch 39A, is provided so that this can be used in an exactly symmetrical manner to control the speed of the draper. The same arrangements are provided in symmetrical manner for the minimum draper speed so that this may be controlled independently of the minimum reel speed. In the embodiment shown, the switch 40E is located on the display 40 adjacent the switch 40C, but other locations may be selected The actual control of the motor 29 driving the reel and the motors 28 driving the drapers is effected using PWM techniques which are well known to one skilled in this art. Thus a momentary/off/momentary switch provides power to a PWM (pulse width modulator) to vary the oil flow in valves to control the speed of the reel and conveyor. The controller 43 that provides the "Index header speed" feature requires a speed signal from the sensor 32 for reel speed (and for conveyor if programmed or use a relative flow setting in combination with ground speed and works as follows:

Provide increased header speed (reel and conveyor speed) with increased ground speed and vice versa, when on/off switch is in the "on" position. In the "on" position, this now causes the "reel" and "conveyor" switches to affect the amount of index relative to ground speed instead of using a separate switch for index. When in the "on" position, an indicator light above the on/off switch will be illuminated.

On draper headers it is desirable that the draper speed be within +/−5 mph from ground speed. When in the "index" mode, the index for the draper will be limited to within this range.

In conjunction with the "index header speed" function, a minimum speed for the reel and conveyor will work as described hereinafter.

The monitors are initially set with minimum reel and conveyor speed set at 0.

To adjust the minimum speed setting, when the index header speed function is on, two additional selections will be available on the monitor displays, "MIN REEL SPD" and "MIN CONV SPD" (if it is programmed to index). The "MIN REEL SPD" will be the very first to pop up whenever the scroll button is hit and the "MIN CONV SPD" will be the second. If the scroll switch is pressed to proceed on to other functions, the reel and conveyor minimum speeds will reappear at the end of the scroll rotation. While in this mode the reel speed and conveyor speed switches will affect the setting of the minimum speeds. The top display will show "xxxx MIN REEL" where xxxx is the min reel speed setting. If the ground speed is below the minimum setting, the reel (or conveyor) speed will change with the minimum adjustment made if the header is engaged. If the ground speed is higher than the minimum reel speed, the reel speed will continue to be controlled by the index function but the display will show the adjusted minimum reel speed setting. If the header is not engaged the min reel speed can still be adjusted. The monitor will remain in this mode for 5 seconds after the last speed adjustment is made or until the scroll switch is pressed again, at which time it will revert to the previous selection.

Whenever during normal operation with index "on" the ground speed drops below the minimum reel speed the machine automatically goes into the "MIN REEL SPD" mode (without depressing the scroll switch) and behaves as outlined above. The display does not change, i.e. show reel/conveyor minimum speed unless it was already selected. If the reel speed switch is pressed under this condition a tone will sound to tell the operator that he is changing minimum speed (and not index) and only if the minimum speed becomes greater than ground speed will the 5 second lock-in period apply.

Whenever the minimum speed is displayed, it will be steady when less than ground speed and flashing when greater than ground speed. While in the process of adjusting the minimum speed, whenever the minimum speed crosses the point where minimum speed is equal to ground speed, a tone will sound.

So it can be seen that the control methodology of the reel does not change for the operator in any condition:

When index is off a switch on the ground speed lever simply controls the reel speed.

When index is on and reel speed is above minimum speed, the index is controlled by the same switch.

When index is on and reel speed is below minimum speed, the minimum speed setting is controlled by the same switch.

The implement control system 39 further includes an additional crop-lodged switch 39E which can be operated to send a control signal to the computer controller 43. Under some conditions crops get lodged badly making it difficult to effectively pick up the crop and cut it cleanly. With the push of the single button, which is the crop-lodged switch 39E the controller 43 is arranged do the following functions:

Operate the cylinders 25A to drop the reel to a pre-set minimum height,

Operate the cylinders 25B to extend the reel fore—aft to the maximum forward position.

Operate the cylinders 18A and 18B to lower the header height to a preset height, defined by the operator, for down crop where the reel tines just skim above the ground.

In this position, which is pre-set by the operator and can be immediately and simply engaged by the operator with the single button 39E, the down crop can be most efficiently lifted and cut. Thus this condition can be implemented immediately and without the necessity of the operator operating the individual control switches 39C and 39D for the reel and header locations.

An operator usually has more time to readjust settings when going from down crop to standing crop, so once back into standing crop the operator can use the three separate control switches to bring the header back to the right settings for standing crop. The wrong setting when getting into down crop usually only results in stripping. The down crop settings, if maintained after the down crop conditions have passed, usually do not result in an unacceptable level of missed crop so that the conventional individual switches can be used for transitioning back to the settings for the standing crop.

In the present arrangement, there is thus provided a speed control module for controlling a speed of operation of at least one of the knife drive system, the reel drive system and the convergence device drive system, and in some cases all of these items as described above.

Whichever one of the items is controlled in speed includes a sensor for monitoring the speed of said at least one of the drive systems. As described above there is provided a manually operable member for manually setting a desired speed of selected system. This can provide a direct numerical input of required speed or can provide a selected or desired speed as a resultant of a number of inputs as described above.

While the drive system concerned relates primarily to the reel drive, the arrangement described herein can be applied to any of the drive systems including a hydraulic motor for providing an output drive, a PWM valve to which an electrical signal is applied for supplying hydraulic fluid to the hydraulic motor at a rate which determines a speed of the drive.

The control module 43 includes a control program stored in a memory 43A which also supplies data for the control program. When a required speed is set by the manually operable member either directly or as a result of a number of inputs as described above, a feedback value is obtained from the sensor of the actual speed to control supply of the value of electrical signals to the PWM valve in accordance with the feedback value to maintain the actual speed at the required speed.

The memory module 43A including a look-up table of values of electrical signals for the PWM associated with speeds. When no feedback value is obtained from the sensor of the actual speed because the sensor is missing or defective, the control module 43 acts to control the PWM valve in accordance with values of electrical signals obtained from the look-up table.

The look-up table comprises 256 voltage/current values for the PWM which correspond to a set of actual speed sensor values taken during a profiling procedure together with extrapolated values. The extrapolated values are corrected for valve non-linearity when the extrapolation is done.

When the sensor is providing a signal for the feedback system of the actual speed, the control module uses the lookup table to get a base PWM value and a feedback value is obtained from the sensor signal and is then added to this base value.

The feedback (sensor) signal corrects for valve load, temperature, system voltage and any valve differences compared to the valve that the profile was made from.

Thus, in order to overcome this shortcoming and maintain a degree of control a technique called valve profiling has been developed and is presented herein. The concept is to be able to "calibrate" the control output so that the control module has a secondary reference point as to how the PWM valve should function in the event of a speed sensor failure. Instead of using the speed sensor signal as a reference, the control system now compares the set point with the stored table (which may in one example provide 256 values) containing the PWM voltage/current values. These values correspond to a set of actual speed sensor values taken during the profiling procedure, plus extrapolated values equalling 256 points.

Table 1 is a set of some values of an example of a table of values obtained for the knife drive of an Auger header. Other machines and other drives of those machines have a different set of values. When the set has been determined for a particular machine, this can be programmed into the control module of other samples of the machine in the expectation that it will provide a close approximation suitable for running the machine in the absence of the sensor as described above.

To determine the profile of a PWM controlled valve the following procedure is used:

Using the software program, the operator disables the feedback and profile functions for the valve to be profiled. By disabling these items the header operation is now considered to be forced into manual operation. In manual mode the operator can now directly control the PWM output signal from 0 to 2.5 A in 256 steps. A table of values is then generated with the following data:

1) The desired value (from the monitoring software).
2) The actual current to the valve (if available). The current is required to produce the extrapolated data.
3) The flow rate and/or the speed of the device being profiled.

From the data obtained, 256 points are now extrapolated and programmed into a "look up" table, (the more initial points taken the more accurate the extrapolated values). The control module then uses the lookup table the following way:

If the operator has set a desired value of 100 (which means they want 100/256'" the valves max flow). The control module uses the lookup table to get the base PWM value (this value is corrected for valve non-linearity when the table extrapolation is done). Under normal operation the feedback value is obtained from the sensor signal and is then added to this base value. This data is sent to the PWM registers which sets the output signal value. The feedback (sensor) signal corrects for valve load, temperature, system voltage and any valve differences compared to the valve that the profile was made from.

If there is no feedback signal, that is there is no sensor or the sensor is damaged or defective, then the profile value is used directly. The resulting speed will be reasonably close to the required speed assuming that the valve being controlled is similar to the valve that the profile was taken from.

The offset value shown in the attached Table 1 indicates how close the valve being controlled is to the valve used to create the profile data. As an example, if the offset is 204, it indicates that the 2 valves are exactly the same. An offset of <4 indicates that the test valve cannot be slowed down enough, while an offset of >508 indicates that the test valve cannot be sped up enough. If the profile is ×700, it indicates the test valve is taking more that 1.5 A, (i.e. the current is −2.5 ma/count). With the offset >700, the current to the PWM valve would be (700×0025)=1.75 A (this current depends on valve temp and battery voltage.) The maximum profile value is 1023, but the valve is considered to be fully open at a profile value of ×700. Any value above 700 is considered to be over driving the valve to ensure it is fully open regardless of temperature or battery voltage.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

TABLE 1

| Desired spm | Canwin Values | | | Current at | |
| | Desired | Offset | Profile | Valve (A) | Actual spm |
| --- | --- | --- | --- | --- | --- |
| 1500 | 184 | 47 | 519 | 0.934 | 1500 |
| 1520 | 187 | 49 | 529 | 0.947 | 1520 |
| 1540 | 189 | 46 | 530 | 0.945 | 1540 |
| 1560 | 192 | 42 | 533 | 0.95 | 1560 |
| 1580 | 194 | 40 | 536 | 0.951 | 1580 |

TABLE 1-continued

| Desired spm | Canwin Values | | | Current at | |
| | Desired | Offset | Profile | Valve (A) | Actual spm |
| --- | --- | --- | --- | --- | --- |
| 1600 | 196 | 38 | 538 | 0.958 | 1600 |
| 1620 | 199 | 33 | 541 | 0.961 | 1620 |
| 1640 | 201 | 27 | 544 | 0.963 | 1640 |
| 1660 | 204 | 23 | 547 | 0.967 | 1660 |
| 1680 | 206 | 16 | 548 | 0.97 | 1680 |
| 1700 | 209 | 12 | 552 | 0.975 | 1700 |
| 1720 | 211 | 7 | 554 | 0.978 | 1720 |
| 1740 | 214 | 3 | 561 | 0.987 | 1740 |
| 1760 | 216 | 3 | 567 | 0.997 | 1810 |
| 1780 | 219 | 2 | 574 | 1.011 | 1860 |
| 1800 | 221 | 2 | 586 | 1.031 | 1950 |

The invention claimed is:

1. A crop harvesting header arranged to be attached to a tractor so as to be moved thereby over the ground for harvesting a standing crop comprising:
 a header frame;
 a cutting knife arranged to provide a cutting action across a width of the header for cutting the standing crop, the knife being driven by a knife drive system;
 a reel mounted above the cutting knife for rotation about a reel axis generally parallel to the ground and at right angles to the direction of operation such that bats of the reel pass over the cutting knife to carry the crop rearwardly of the knife, the reel being driven by a reel drive system;
 a convergence device rearward of the cutting knife for converging the cut crop into a swath for discharge from the header onto the ground, the convergence device being driven by a convergence device drive system;
 a speed control module for controlling a speed of operation of at least one of the knife drive system, the reel drive system and the convergence device drive system;
 a sensor for monitoring the speed of said at least one of the drive systems;
 the control module including a manually operable member for manually setting a desired speed of said at least one of the drive systems;
 said at least one of the drive systems including a hydraulic motor for providing an output drive, a PWM valve to which an electrical signal is applied for supplying hydraulic fluid to the hydraulic motor at a rate which determines a speed of the drive;
 the control module including a control program and a memory for supplying data for the control program;
 the control module being arranged, when a required speed is set by the manually operable member, to obtain a feedback value from the sensor of the actual speed and to control supply of the value of electrical signals to the PWM valve in accordance with the feedback value to maintain the actual speed at the required speed;
 the memory module including a look-up table of values of electrical signals for the PWM associated with speeds;
 the control module being arranged, when no feedback value is obtained from the sensor of the actual speed, to control the PWM valve in accordance with values of electrical signals obtained from the look-up table.

2. The crop harvesting header according to claim 1 wherein the look-up table comprises voltage/current values for the PWM.

3. The crop harvesting header according to claim 1 wherein look-up table contains 256 values.

4. The crop harvesting header according to claim 1 wherein the values correspond to a set of actual speed sensor values taken during a profiling procedure.

5. The crop harvesting header according to claim 4 wherein the values contain extrapolated values.

6. The crop harvesting header according to claim 5 wherein the extrapolated values are corrected for valve non-linearity when the extrapolation is done.

7. The crop harvesting header according to claim 1 wherein, when a feedback value is obtained from the sensor of the actual speed, the control module uses the lookup table to get a base PWM value and a feedback value is obtained from the sensor signal and is then added to this base value.

8. The crop harvesting header according to claim 7 wherein the feedback (sensor) signal corrects for valve load, temperature, system voltage and any valve differences compared to the valve that the profile was made from.

* * * * *